Dec. 12, 1961 P. CHEILIK 3,013,255

MAGNETIC READ AND WRITE SYSTEM

Filed Jan. 13, 1958

Inventor
PHILIP CHEILIK
By [signature]
Attorney

United States Patent Office 3,013,255
Patented Dec. 12, 1961

3,013,255

MAGNETIC READ AND WRITE SYSTEM

Philip Cheilik, Bronx, N.Y., assignor to International Telephone and Telegraph Corporation, Nutley, N.J., a corporation of Maryland Filed Jan. 13, 1958, Ser. No. 708,646
4 Claims. (Cl. 340—174.1)

This invention relates to data processing systems and in particular to a system using magnetic tape storage means.

The principles of magnetic storage are well known and are described in the text book "Magnetic Recording" by S. J. Begun, published by the Technical Division of Murray Hill Books, 1949. In the usual practice of reading and writing on a magnetic tape having a plurality of tracks there are many magnetic heads housed in the same structure. The proximity of these numerous heads, one to another, permits the flux from one head to engage another head and induce spurious signals therein. The fringing effect at the respective gaps of the many magnetic heads also give rise to spurious signals being induced in one head by the flux passing through another head. If one of the heads should be performing a reading (play-back) operation while the other adjacent head is performing a writing (recording) operation there are spurious signals called cross talk, generated in the reading head by the flux from the adjacent writing head and the spurious signals are transmitted to the decision circuits of the data processing system. Obviously, the spurious signals lead to incorrect results.

This problem is especially acute when a tape is used and there are clock pulses included on the tape. Since a tape operation is not necessarily synchronized, clock pulses are usually provided to insure a timing means so that the other units of the data processing system can be timed to function when information is transferred to and from the tape. A system for reading and writing with adjacent heads on a magnetic tape without having any cross-talk is therefore desirable.

It is an object of the present invention to provide an improved magnetic reading and writing system.

It is a further object of the present invention to provide a magnetic tape reading and writing system wherein there is a minimum of cross-talk between magnetic reading and writing heads functioning simultaneously on adjacent tracks of a magnetic tape.

In accordance with a main feature of the present invention there is provided a delayed feed-back signal blocking circuit coupled between the decision circuits of the data processing system and the reading head to initially pass a read pulse which in turn conditions the blocking circuit to block a read signal for a predetermined time.

Another feature of the present invention provides coincidence circuits coupled to the write head having an input thereto conditioned by a signal from the reading head such that there is an inherent delay of a writing pulse until after a reading pulse has been received, thus insuring that the "predetermined time" mentioned in the last feature is during the rise and fall time of the write pulses.

The foregoing and other objects and features of this invention and the manner of attaining them will become more apparent and the invention itself will be best understood by reference to the following description of an embodiment of the invention taken in conjunction with the accompanying drawings, wherein.

Figures 1, 2, 3:
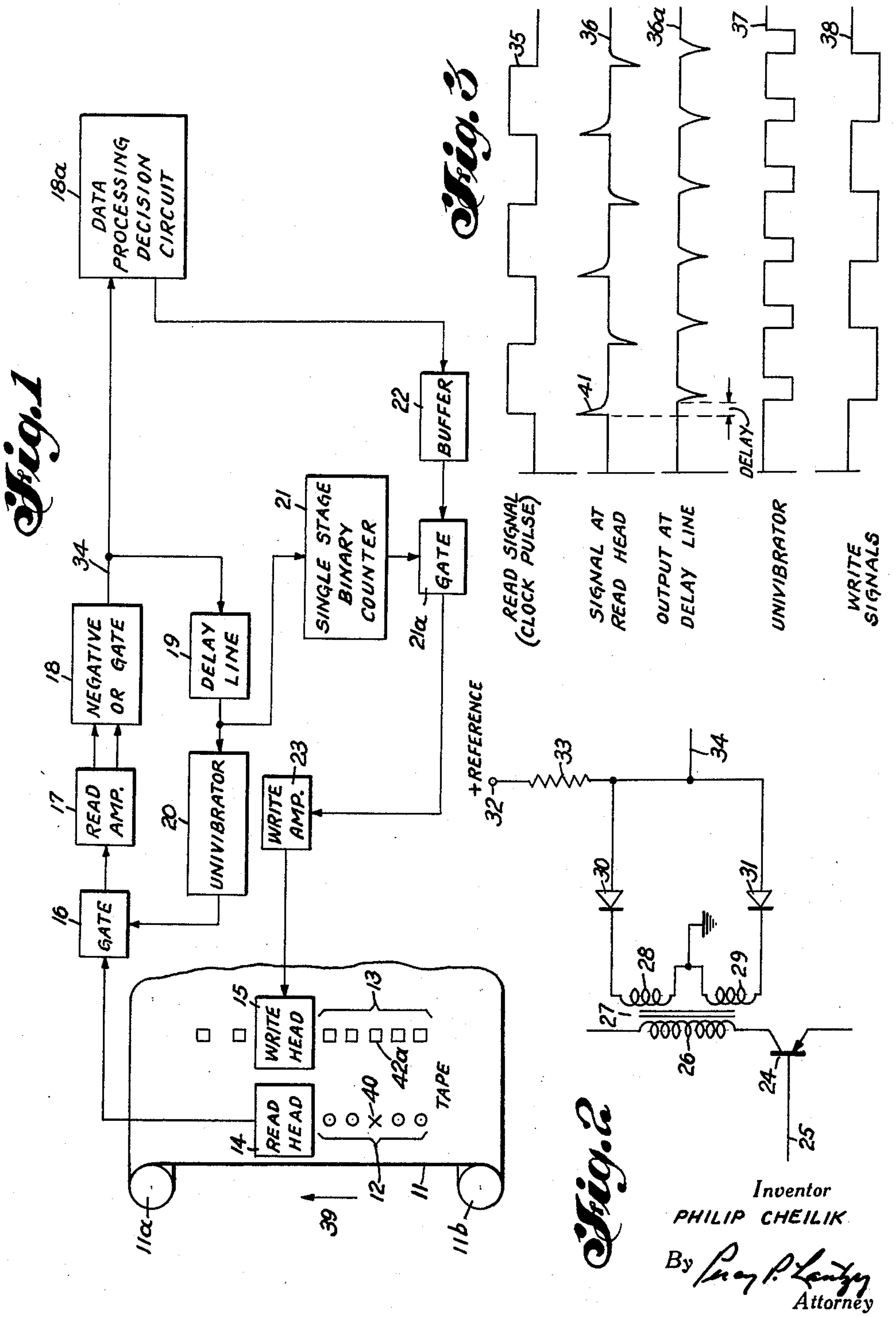
FIG. 1 is a block diagram of the system.
FIG. 2 is a schematic of the last stage of an amplifier coupled to a negative "or" gate.
FIG. 3 is a series of graphs to show the time relation between the functions of the various components.

Referring to FIG. 1 there is shown a tape 11 on which there are clock pulse positions 12 and positions for writing information 13. The tape 11 is wound on two driving spools 11a and 11b to drive the tape. Adjacent the tape 11 and located for the purposes of reading and writing magnetic information therefrom and thereon are located the read head 14 and the write head 15. There is a blocking gate 16 coupled to the read head 14. The output of the gate 16 is coupled to a read amplifier 17 which in turn is coupled to a negative "or" gate 18. The output of the negative "or" gate is coupled to control various operations of the data processing decision circuits 18a as well as coupled to a feed-back circuit including a delay line 19 and a univibrator 20 in series to the blocking gate 16. Coupled to the output of the delay line 19 is a flip-flop circuit 21 designed to operate as a single stage binary counter coupled to the write gate 21a. The write gate 21a is conditioned at its other input by the output of the buffer 22. The output of the gate 21a is coupled to the write amplifier 23 which is in turn coupled to the input of the write head 15.

In FIG. 2 there is shown a schematic diagram of the last stage of the amplifier 17 and the negative "or" gate 18. The transistor 24, which is a part of amplifier 17, has its base input 25 coupled to the preceding stage of the amplifier. The primary 26 of the transformer 27 is coupled to the collector of the transistor 24. The secondary windings 28 and 29 of the transformer 27 are coupled to the diodes 30 and 31 to form the two inputs of the negative "or" gate represented by 18 of FIG. 1. The diodes are coupled to a positive reference potential at 32 through the resistance 33 and there is an output means 34 coupled in parallel to the diodes.

FIG. 3 shows a series of graphs depicting the time relation between the functions of the various components. The graph 35 shows the read pulse or clock pulse timing. The graph 36 shows the differentiated positive and negative pulses coming from the read signals. The graph 37 shows the initiation of the univibrator pulse including the slight time delay. The graph 38 in connection with the graph 37 shows the rise and fall of the write signal occurring during the univibrator pulse.

Referring to FIG. 1 to better understand the operation, the tape 11 is shown moving according to the arrow 39 under the read head 14 and the write head 15. The circles in the clock pulse positions 12 indicate that there is a clock pulse present. The "X" at 40 indicates that there is no clock pulse present which may indicate that the tape is faulty at that point or has been non-receptive to magnetization. As the tape 11 passes under the read head 14 for each of the circle positions there is a read pulse 35 experienced at the read head 14. The read pulse is passed through the gate 16 to the read amplifier 17. The leading edge of the read pulse will appear as shown by the pip indication 41 of FIG. 3. However, this positive pip when amplified and passed to the negative "or" gate 18 is transmitted as a negative pulse to the output lead 34. Referring briefly to FIG. 2 it is clear that irrespective of whether the last stage of the amplifier 17 is amplifying a positive or negative pulse one of the secondary windings 28 or 29 will be experiencing a negative pulse. This being true there will be conduction from this negatively induced winding through either the diode 30 or 31 to the positive reference potential 32 thus giving a negative output at 34. Likewise it is also clear that if there is no signal output, for instance, when the tape moves to position the "X" spot 40 under the read head 14, there will be conduction through both diodes and the voltage appearing at 34 will be that of the ground reference potential 32a. If there is no negative output at 34 as just described then there will not be an attempt to write at the position 42a. The positive pulse generated by the leading edge of the clock pulse as shown at 41 is transformed into a negative pulse as described above and passed to the delay line 19. The delay line 19 can be any well-known delay line such as those described in the text "pulse and Digital Circuits" by Millman and Taub, published by McGraw-Hill, 1956. At the delay line 19 the pulse is delayed as shown by the graph 36a for a brief period to insure that it is operative on the various operations including the flip-flop 21. After the pulse has passed through the delay line 19, it is received at the input of the univibrator 20 and causes the univibrator to "flip" to its quasi-stable state wherein the pulses depicted by the graph 37 are generated. The pulses generated in the quasi-stable state of the univibrator 20 are transmitted to the gate 16 to close the gate 16 during the predetermined time of the univibrator pulse. The univibrator 20 can be any well-known univibrator or monostable multivibrator circuit which is triggered by the negative pulse, examples of which are found in the text above by Millman and Taub. The output of the delay line 19 is also passed to the flip-flop 21. One output, the "on" side, is coupled to condition the gate 21a. The gate 21a will remain open until the trailing edge of the read pulse flips the flip-flop 21 to its normal or off side.

In the buffer 22 there is temporarily stored information to be written on the tape. The buffer 22 is a device, by definition, to compensate for a difference in rate of flow of information or time of occurrence of events when transmitting information from one device to another. Examples of such a buffer are also found in the abovementioned text by Millman and Taub. The output of the buffer 22 is transmitted to the gate 21a. When the buffer information is present and the gate 21a is opened by the output signal from the flip-flop 21 the information pulse passes through the gate 21a to the write amplifier 23. After having been duly amplified at the write amplifier 23, the information pulse is passed to the write head 15 to be magnetically written or recorded on the tape 11. Since the cross-talk between the read head 14 and the write head 15 would take place during the rise and fall time of the writing pulse, it is necessary that the read circuit be blocked during this rise and fall time. As can be seen from the graphs of FIG. 3, the read signals at 36 cause the univibrator to trigger at the beginning and end of the clock pulse. It is during the predetermined time of the univibrator that the rise and fall of the write pulse takes place and this operation is assured since the read pulses trigger the univibrator as well as the flip-flop 21 to open the gate 21a.

The circuit by way of illustration is shown to be operative with an arrangement for writing information pulses on a track adjacent to a clock pulse track of a magnetic tape. Obviously with proper coincidence circuitry the invention could be applied to permit the reading of data information rather than just the clock pulse information, while substantially simultaneously writing some data information on an adjacent track.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a data processing system apparatus for reading signals from one track of a recording means and substantially simultaneously writing signals on an adjacent track of said recording means comprising recording means including first and second recording tracks, reading means communicating with said first track for reading recorded timing signals from said first track and for deriving in correspondence with the initiation and termination of each said timing signal respective first and second pulses of opposite polarity, means responsive to each of said derived pulses for producing a trigger pulse, writing means including a write head communicating with said second track, first circuitry means including a coincidence gating circuit coupling a source of input signals to said write head, control means responsive to said trigger pulses derived from said first pulses for enabling said coincidence gate circuit to transfer signals to be recorded onto said second track, said control means being further responsive to said trigger pulses derived from said second pulses for disabling said coincidence gating circuit, whereby said coincidence gating circuit is enabled for a time equal to the full duration of each said timing signal irrespective of variations in the duration of said timing signals.

2. In a data processing system apparatus for reading signals from one track of a recording means and substantially simultaneously writing signals on an adjacent track of said recording means comprising recording means including first and second recording tracks, reading means communicating with said first track for reading recorded timing signals from said first track and for deriving in correspondence with the initiation and termination of each said timing signal respective first and second pulses of opposite polarity, means responsive to each of said derived pulses for producing a trigger pulse, means responsive to each said trigger pulse for disabling said reading means for a predetermined time following each said trigger pulse writing means including a write head communicating with said second track, first circuitry means including a coincidence gating circuit coupling a source of input signals to said write head, control means responsive to said trigger pulses derived from said first pulses for enabling said coincidence gating circuit to transfer signals to be recorded onto said second track, said control means being further repsonsive to said trigger pulses derived from said second pulses for disabling said coincidence gating circuit, whereby said coincidence gating circuit is enabled for a time equal to the full duration of each said timing signal irrespective of variations in the duration of said timing signals.

3. In a data processing system apparatus for reading signals from one track of a magnetic recording means and substantially simultaneously writing signals on an adjacent track of said recording means comprising magnetic recording means including first and second adjacent recording tracks, a read head communicating with said first track and transferring timing signals recorded thereon, each said transferred timing signal comprising first and second pulse signals of opposite polarity and having a minimum separation in time, a normally open blocking circuit coupling said first and second pulse signals from said read head, means responsive to each said coupled first and second pulse signals for producing a trigger pulse of a given polarity, delay means for delaying said trigger pulses, first control means responsive to each said delayed trigger pulse for conditioning said blocking circuit to block the transfer of signals from said read head for a predetermined time following each said trigger pulse, said predetermined time being less than said minimum separation in time, of said first and second pulses, a write head communicating with said second track of said recording means for writing signals thereon, first circuitry means including a coincidence gating circuit coupling a source of input signals to said write head, and second control means responsive to said delayed trigger pulses for enabling said coincidence gating circuit in response to said delayed trigger pulses derived from said first pulse signals and for disabling said coincidence gating circuit in response to said delayed trigger pulses derived from said second pulse signals, whereby said coincidence gating circuit is enabled during the exact duration of each said timing signal regardless of variations in said duration and further whereby said read head blocking circuit is disabled during the initiation and termination of the transfer of signals thru said write head coincidence gating circuit to prevent cross talk between said read and write heads.

4. Apparatus according to claim 3 wherein said second control means comprises a single stage binary counting circuit conditioned to opposite stable states by successive ones of said trigger pulses.

References Cited in the file of this patent

UNITED STATES PATENTS

| | | |
|---|---|---|
| 2,797,401 | Green | June 25, 1957 |
| 2,832,064 | Lubkin | Apr. 22, 1958 |
| 2,904,775 | Kosten | Sept. 15, 1959 |